(12) United States Patent
Zimmermann

(10) Patent No.: US 12,393,278 B2
(45) Date of Patent: Aug. 19, 2025

(54) APPARATUS FOR THE PRODUCTION OF FOODS WITH A NON-CONTACT INPUT DEVICE

(71) Applicant: Albert Handtmann Maschinenfabrik GmbH & Co. KG, Biberach (DE)

(72) Inventor: Robert Zimmermann, Biberach (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 0 days.

(21) Appl. No.: 18/346,730

(22) Filed: Jul. 3, 2023

(65) Prior Publication Data

US 2024/0012486 A1 Jan. 11, 2024

(30) Foreign Application Priority Data

Jul. 5, 2022 (EP) ..................................... 22182947

(51) Int. Cl.
*G06F 3/01* (2006.01)
*G09G 3/00* (2006.01)

(52) U.S. Cl.
CPC ............. *G06F 3/017* (2013.01); *G09G 3/001* (2013.01)

(58) Field of Classification Search
None
See application file for complete search history.

(56) References Cited

U.S. PATENT DOCUMENTS

| | | | |
|---|---|---|---|
| 2002/0006807 A1* | 1/2002 | Mantyjarvi | G06F 3/011 455/557 |
| 2003/0128188 A1* | 7/2003 | Wilbrink | G06F 1/1626 345/158 |
| 2006/0114233 A1* | 6/2006 | Radivojevic | G06F 3/0426 345/168 |
| 2010/0301995 A1 | 12/2010 | Nguyen et al. | |
| 2014/0156470 A1* | 6/2014 | Raman | G06F 3/0488 705/27.1 |
| 2016/0174583 A1* | 6/2016 | Van Steijn | A22C 17/0073 452/184 |
| 2018/0093901 A1 | 4/2018 | Brennan et al. | |
| 2020/0229482 A1* | 7/2020 | Mcginnis | B08B 3/041 |
| 2022/0253098 A1* | 8/2022 | Berliner | G06F 1/1686 |

FOREIGN PATENT DOCUMENTS

| | | |
|---|---|---|
| EP | 2377405 A1 | 10/2011 |
| EP | 2442196 A2 | 4/2012 |
| EP | 3042564 A1 | 7/2016 |
| JP | 3219968 U | 1/2019 |
| JP | 2019109636 A | 7/2019 |
| JP | 2019139698 A | 8/2019 |
| JP | 2020052681 A | 4/2020 |

OTHER PUBLICATIONS

Japanese Patent Office, Office Action Issued in Application No. 2023-108012, Jun. 25, 2024, 17 pages.

* cited by examiner

*Primary Examiner* — Parul H Gupta
(74) *Attorney, Agent, or Firm* — McCoy Russell LLP

(57) ABSTRACT

The disclosure relates to an apparatus for food production, in particular a filling machine with a control device that is connected to an input device for operating the apparatus. The input device is configured as a non-contact input device.

13 Claims, 5 Drawing Sheets

APPARATUS FOR THE PRODUCTION OF FOODS WITH A NON-CONTACT INPUT DEVICE

CROSS REFERENCE TO RELATED APPLICATIONS

The present application claims priority to European Patent Application No. 22182947.6 filed on Jul. 5, 2022. The entire contents of the above-listed application is hereby incorporated by reference for all purposes.

TECHNICAL FIELD

The disclosure relates to an apparatus for the production of foods.

BACKGROUND

Such apparatuses for food production, e.g. filling machines, are often operated or controlled by input units with capacitive or resistive touch displays. Attachments, such as scales, linking lines, suspension devices, can also be operated using appropriate input units. Such input units must be ergonomic and positioned clearly visible for relaxed and safe working. An inclined installation of the display is often necessary or even a separate installation housing. Both variants are expensive and have disadvantages when it comes to cleaning. There is often no room for a correspondingly ergonomic arrangement even with the different apparatuses.

SUMMARY

Operation is effected by the operator actuating the touch display with his fingers. Especially in the sector of food production, operators have to wear gloves for hygiene reasons or for occupational safety, where touch displays often only react unreliably. Finger actuation, even when wearing gloves, often results in soiling and contamination. In particular with filling machines with which mainly pasty materials, e.g. sausage meat, are filled, soiling occurs due to the pasty materials and e.g. water, and the display is ultimately damaged. In this way, pathogens can also be transmitted among operators and via them to the product.

Proceeding from there, the present disclosure is based on the object of providing an apparatus for the production of foods that enables the machine to be operated in an ergonomic, hygienic, and space-saving manner.

This object is satisfied according to the disclosure by the features described herein.

According to the disclosure, this object is satisfied by an apparatus for the production of foods, in particular by a filling machine with a control device that is connected to a non-contact input device for operating the apparatus.

A non-contact input device is understood to be an apparatus that allows commands and values to be entered, which are then forwarded to the control device, without touching a display or a keyboard. The non-contact input device can therefore be configured as a screen i.e. a display, and an operating unit, i.e. an input terminal.

Since the input device is configured as a non-contact input device, soiling and contamination of the input device can be effectively prevented, which is essential in particular in the food production sector. The non-contact input device can therefore not be damaged since the virtual user interface is insensitive to dirt, water, and mechanical influences. Since the input device is only a projection in space, the operator cannot bump into it and injure himself.

Transmission of pathogens can also be prevented. In addition, there is the advantage that the input device can be attached ergonomically at a location that is easily visible, even if there is little space available. For example, the non-contact input device can also be arranged in a region where there is no space, for example, for a touch display because e.g. smoking sticks have to be lifted, shirred casing sticks have to be replaced, or mechanical work is necessary. But a non-contact input device makes it possible to simply move oneself or tools through the virtual user interface during mechanical work.

In addition, a higher level of reliability of the input arises, in particular when bulky work gloves have to be worn.

It is particularly advantageous to have the input device comprise a projector for generating a virtual user interface. The operator can then operate and control the apparatus on this virtual user interface, e.g. also enter and query parameters. The projector advantageously comprises an image source, in particular a display, e.g. LCD display, as well as a plate that focuses light rays that are diffusely emitted by the image source to form the virtual image of the user interface.

Since the virtual user interface is a reproduction of the image source, i.e. the display, changing parameters and settings can be displayed. The control device preferably has at least one interface for sending changeable video signals to the image source, i.e. to the display, in particular an LCD display.

This means that the virtual input device can be easily retrofitted if the control device has an interface for outputting video signals. The signals can be output either wirelessly or over a wired connection, e.g. via an HDMI interface.

The apparatus for the production of foods advantageously has a sensor device which is configured and arranged such that a non-contact input using a finger or object and/or gesture control (e.g. a "swipe") can be detected and corresponding signals can be sent to the control device.

A respective sensor can be configured, for example, as an IR sensor device that generates an infrared radiation field. By detecting, for example, the reflection of the IR radiation on the finger and/or object introduced into the beam path, the position as well as a motion in the beam path can be detected.

This position then corresponds to a specific position of the virtual user interface. However, it is also possible for the sensor device to comprise, for example, a camera which can be used to record the non-contact input.

According to a preferred embodiment, the apparatus for food production has several non-contact input devices at different locations which are preferably connected to the control device.

It is thus possible for non-contact input devices to be available to the operator at different locations, in particular in the case of a longer processing line. The operator then has an overview of the ongoing process from different locations and can act immediately if necessary and make appropriate entries without having to travel a long distance to the next display. The input devices are advantageously connected to the control device of the apparatus, where all input devices preferably show the same virtual user interface, i.e. the same "screen". The input devices can there be connected directly to the control device or, for example, via other control units or other input devices. It is also possible that the user interfaces adiffer—e.g. are adapted to your [sic] position.

According to a preferred embodiment, the apparatus is a filling machine with at least one attachment, in particular from the following group: linking device, clipper, suspension device, weighing device, shaping and separating device, transport device, sorting device, packaging device, robot, etc.

According to a preferred exemplary embodiment, the filling machine is configured such that, in addition to the non-contact input device at the filling machine, the at least one attachment has a non-contact input device that is connected to the control device of the filling machine. This means that the non-contact input unit of an attachment receives the video signals via the control device of the apparatus, i.e. the image source is controlled accordingly. However, the non-contact input unit of the attachment can also receive the video signals via its own control device, which in turn can be connected to the control device of the filling machine.

It can thus be ensured that several input devices receive the same video signals for their image source, i.e. their display, in particular an LCD display, such that there is an identical user interface or one adapted to the respective requirements of the corresponding attachment at several locations of the apparatus.

This means that the respective image sources receive either the same video signals or different video signals.

According to a preferred embodiment, the filling machine and/or an attachment has a non-contact input device each on sides that are oppositely disposed when viewed in direction of transport T. This means work can be performed on an attachment, e.g. a suspension device, from two oppositely disposed sides.

According to a preferred embodiment, the angle of inclination of the virtual user interface can be changed relative to a horizontal plane. With a suitable configuration, the angle about the vertical axis can also be adjusted to suit the operator's position.

BRIEF DESCRIPTION OF THE DRAWINGS

The present disclosure shall be explained hereafter in more detail with reference to the following figures.

DETAILED DESCRIPTION

Figure 1A:
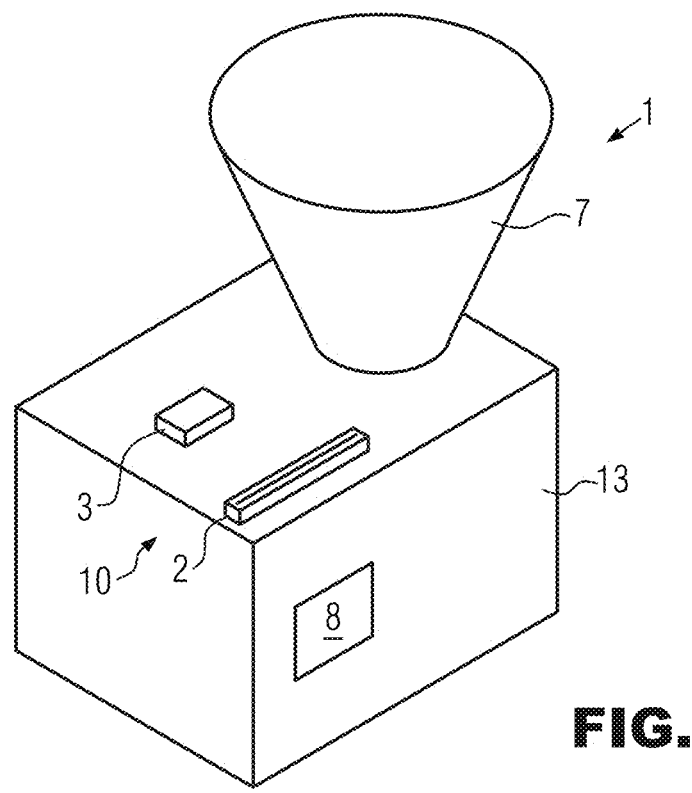
FIGS. 1A-1D schematically show the basic principle of the apparatus according to the disclosure using a filling machine.

FIGS. 1A-1D and FIG. 3 show in a simplified schematic representation an apparatus for food production, presently in the form of a filling machine. As can be seen from the figures, a filling machine has, e.g. a hopper 7 for filling in foods to be filled, as well as a machine housing 13. Disposed below hopper 7 is a conveying mechanism 12, e.g. a vane pump 12 (see also FIG. 3), via which the filling material can be ejected e.g. via a filling tube 16 (FIG. 3), for example, into sausage casings.

The filling machine has a control device 8 which is connected to an input device 10 for operating apparatus 1. Input device 10 according to the disclosure is a non-contact input device.

For this purpose, input device 10 has an optical projector 3 for generating a virtual user interface 4.

Figure 2:
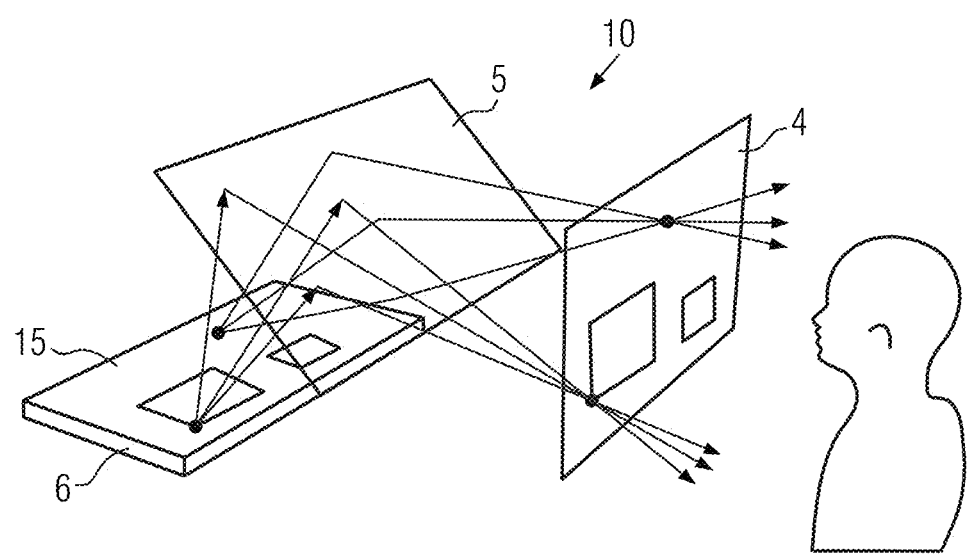
FIG. 2 schematically shows a projector for producing a virtual user interface according to the present disclosure.

FIG. 2 shows a possible embodiment for generating a respective virtual user interface image 4. Projector 3 comprises an image source 6 in the form of a display, in particular an LCD display, which shows a user interface, for example, with several input options and displays etc., as is evident from FIG. 2. The image source or display 6, respectively, is connected to control device 8 and receives corresponding image signals from control device 8. The light rays emitted diffusely by the image source impinge on a plate 15 which is presently inclined by 45°, for example, relative to a plane in which the display is disposed. The plate deflects the incident light presently by further 45° and focuses the diffusely emitted light rays to form virtual image 4 of user interface 4. A holographic plate with several layers of micromirrors, for example, can be used as the plate, as is also used, for example, with head-up displays.

The operator can therefore effect a non-contact input by tapping on the virtually displayed keypad as with a normal display or by performing gesture control, such as swiping the screen, etc.

For this purpose, the apparatus has a sensor device 2 which is configured and arranged such that it can detect non-contact input by a finger or an object and/or gesture control.

Figure 1B:
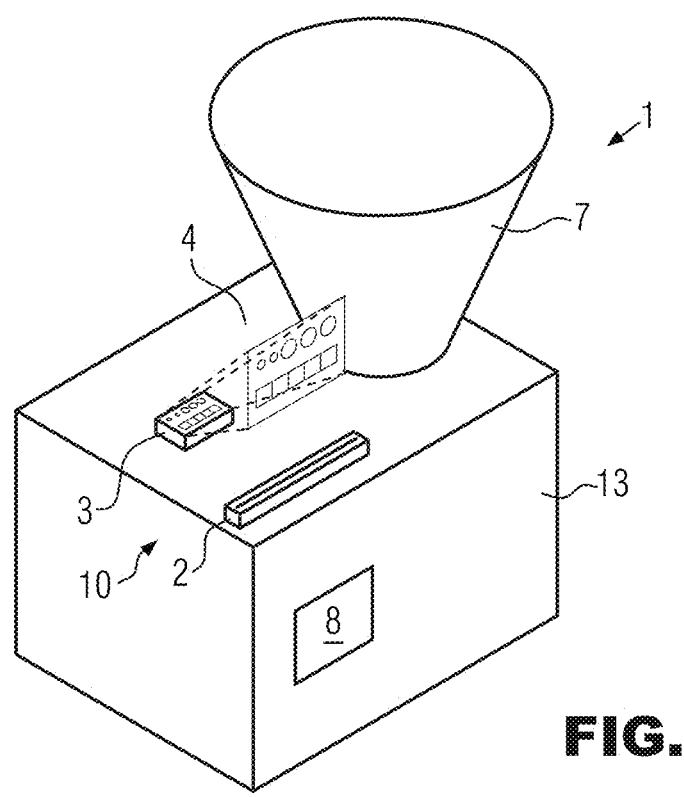
Figure 1C:
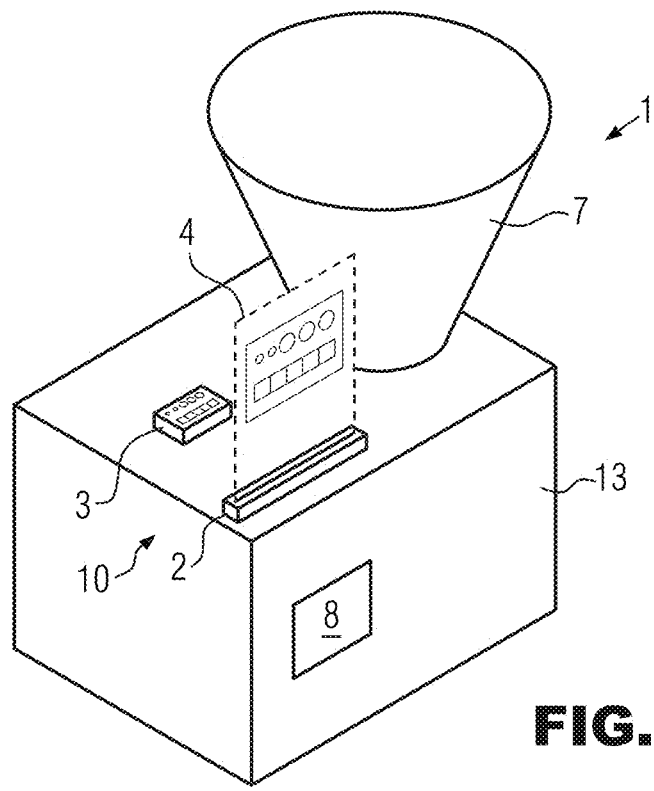
Figure 1D:
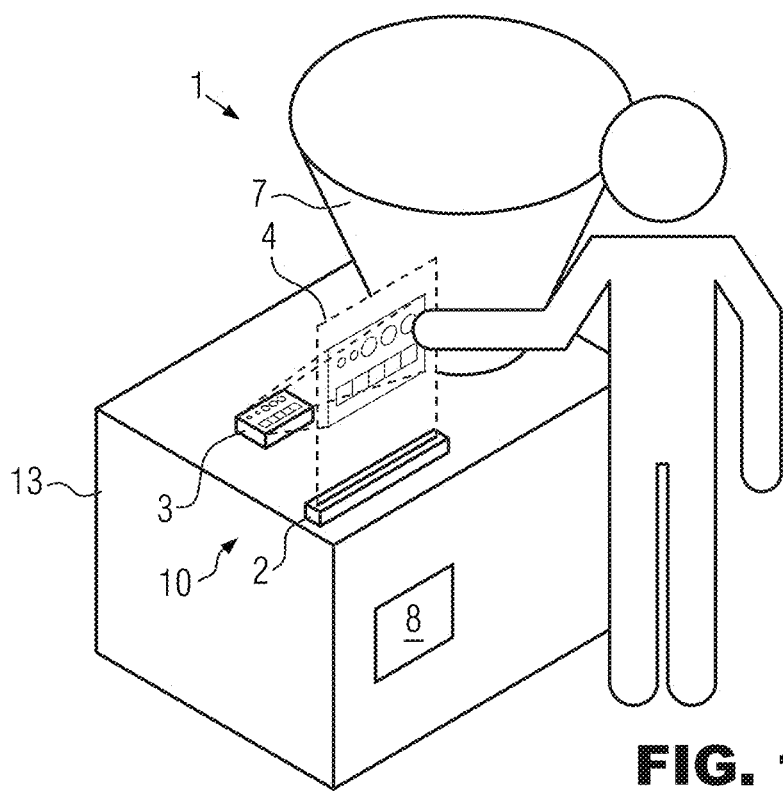

FIG. 1A shows projector 3 and sensor device 2 in a simplified schematic representation, where virtual user interface 4 is generated by projector 3, as shown in FIG. 1B. "Scanning" by sensor device 2 is shown in a simplified schematic representation in FIG. 1C. FIG. 1D shows the operator at non-contact input device 10, where virtual user interface 4 serves as a display and operating unit. The sensor device can comprise, for example, an IR sensor device, a laser scanner, or a video camera.

Figure 5:
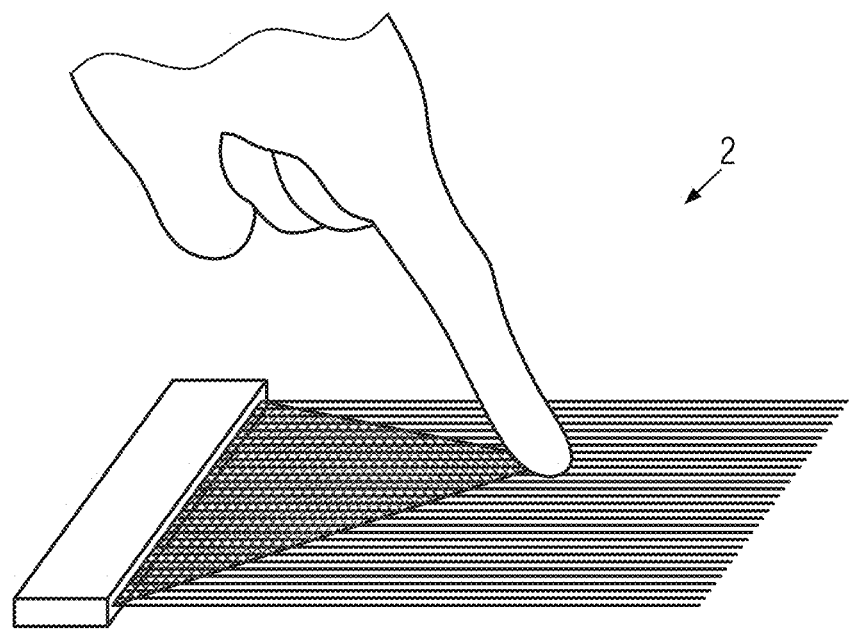
FIG. 5 shows schematically a sensor device according to the present disclosure.

FIG. 5 shows the functional principle of an infrared sensor device. Sensor device 2 generates an infrared radiation field. For example, virtual user interface 4 is in the same plane and at the same position as the infrared radiation field. If a finger or an object taps on virtual user interface 4, then the beam path is broken, i.e. IR rays are reflected back and can be detected. The position as well as a motion in the infrared radiation field can thus be detected. These signals can then be sent to control device 8.

This is just one example of how the input might be captured.

Alternatively, other sensor devices such as a video camera with which the location at which the virtual user interface is touched or a gesture control can be recorded and corresponding values can be forwarded to the control device are also conceivable.

In the embodiment shown in FIGS. 1A-1D, the arrangement of projector 3 and sensor device 2 is indicated only schematically. Two devices 2, 3 can be integrated in the filling machine, i.e. e.g. be attached to or in housing 13 such that virtual user interface 4 is in a desired location, presently e.g. in front of the hopper. In this case, there are advantageously no mechanical limitations for user interface 4 since, if necessary, one can simply reach through user interface 4 that is projected into the room. Virtual user interface 4 can therefore be placed freely in space at a location where it appears advantageous, without the need for special mounts, etc. that impede the work of the operator. But it is also possible to mount projector 3 and sensor device 2 on the ceiling or on another device.

Figure 3:
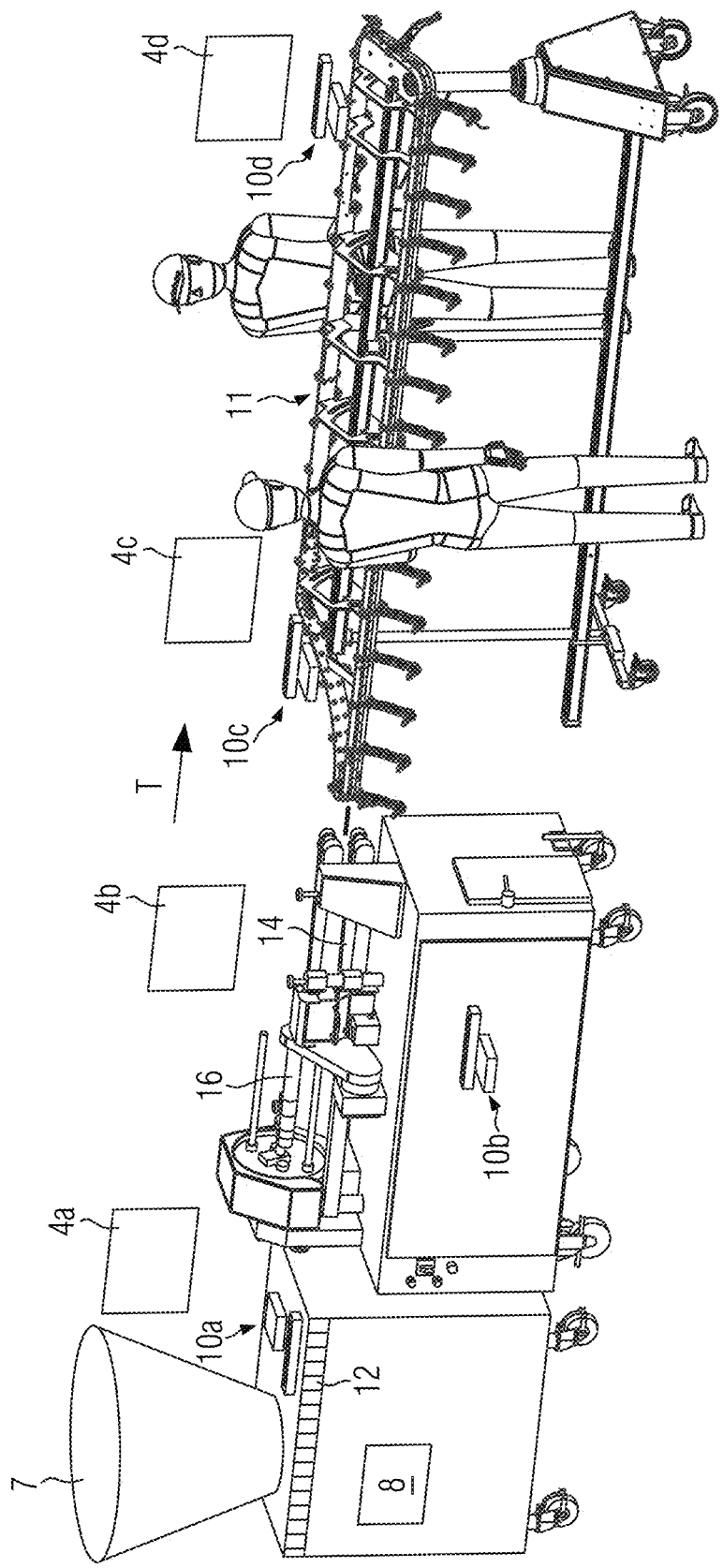
FIG. 3 shows a perspective illustration of a filling machine with several non-contact input devices according to the present disclosure.

FIG. 3 shows a possible embodiment in which apparatus 1 is a filling machine with several so-called attachments. Filling machine 1 there has a control device 8, a conveying mechanism 12, and a non-contact input device 10*a* with a virtual user interface 4*a*. The filling machine uses conveying mechanism 12 to convey filling material, e.g. into a filling tube, via which, for example, pasty material can be ejected into a sausage casing. Connected in the direction of transport downstream of the filling machine is a linking device 9 via which a filling tube 16 can be rotated about its longitudinal axis in order to link the sausage strand produced at the separation points. Linking device 9 presently also has a transport device 14 with oppositely disposed conveyor belts between which, for example, the sausages produced are conveyed in direction of transport T.

Linking device 9 also has at least one non-contact input device 10*b* which generates a virtual image, i.e. a virtual user interface 4*b*. The virtual user interface can be arranged, for example, directly above a filling tube, which would not be possible with a stationary display. In general, the advantage arises that the space is not blocked by virtual user interface 4*b* since it is easy to reach through the user interface when working on linking device 9.

When viewed in the direction of transport T, disposed behind linking device 9 is a suspension device 11 which has rotating hooks on which, for example, individual sausages or chains of sausages are suspended and transported. The chains of sausages can then be raised upwards and transported away by way of smoking sticks engaging in corresponding sausage loops. Suspension device 11 also has at least one non-contact input device 10*c, d*, presently two input devices 10*c* and 10*d* on oppositely disposed sides of the suspension device, such that an operator can work at the apparatus from each side and has user interface 4 in view. Since the virtual user interfaces are only images projected into space, they do not interfere if, for example, a smoking stick has to be taken off and moves through the image plane. Damage to the input device can't thereby also be effectively prevented. In addition, there is no soiling.

Figure 4:
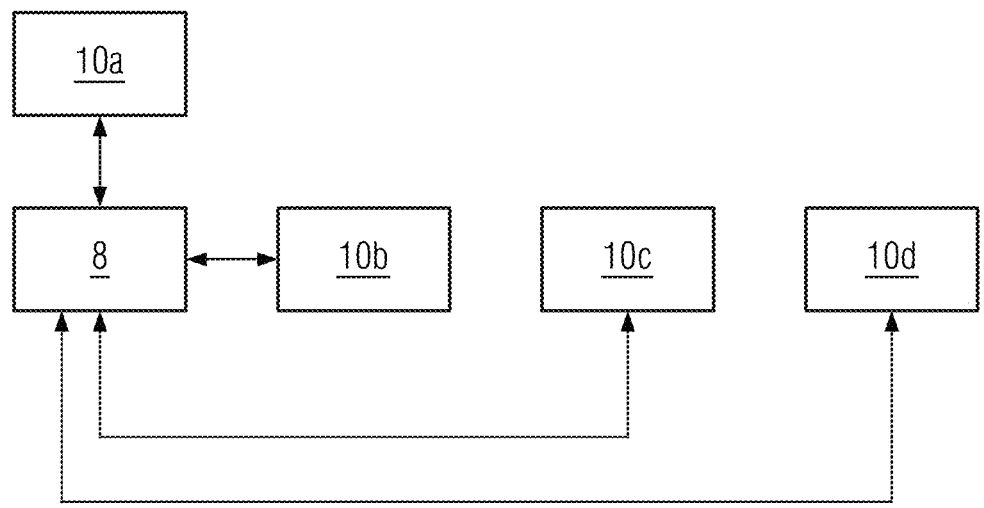
FIG. 4 shows schematically the control device of a food processing machine with several non-contact input devices.

FIG. 4 shows in a simplified schematic representation possible control of the virtual input devices, as explained, for example, in the context of FIG. 3. Video signals can be sent via control device 8 of filling machine 1, e.g. via a corresponding interface or wirelessly to virtual input device 10*a*, i.e. in particular its image source, i.e. display 6, so that virtual user interface 4*a* is generated in the region of filling machine 1 by projector 3. Virtual input device 10*b* can also be connected to control device 8 of filling machine 1 such that video signals are sent to corresponding image source 6 for generating virtual user interface 4*b*. The same also applies to virtual input device(s) 10*c* and 10*d* of the suspension device which also receive video signals from machine control device 8 of filling machine 1 for generating corresponding virtual user interfaces 4*c* and 4*d*.

Advantageously, input devices 10*a*, 10*b*, 10*c*, 10*d* receive the same video signals from control device 8 such that same user interface 4 can be viewed at different locations of the apparatus, i.e. of the production line. This also means, for example, that if a change is entered at a virtual input device 10, a corresponding change can then also be recognized in other user interfaces 4.

However, it is also possible for control device 8 of filling machine 1 to send different video signals to different virtual input devices 10*a*, 10*b*, 10*c*, 10*d*, where these video signals are adapted to the functions of the corresponding attachments. In the embodiment shown in FIG. 4, it is not absolutely necessary for image sources 6 or displays 6 to be connected directly to control device 8 of the filling machine. It is also possible for control device 8 to be connected to corresponding control devices of the attachments via which the corresponding image sources or displays 6 are then controlled by corresponding video signals.

It is also possible for the inclination of virtual user interface 4 to be adjustable relative to a horizontal plane. For this purpose, projector 3 and sensor device 2 can be mounted on a common support which is pivotable about a horizontal axis.

With a corresponding configuration, the angle to the vertical axis can also be set alternatively or simultaneously.

For example, a motion mechanism, e.g. a mechanical coupling in the form of a sprocket, toothed belt, or linkage can be provided which controls the inclination of projector 3, i.e. presently image source 6 and plate 5, relative to the horizontal plane (and/or relative to a vertical plane which is e.g. perpendicular to the horizontal plane).

At the same time, sensor device 2 is also moved accordingly synchronously so that the projection plane and the scanning plane remain congruent and retain their common point of origin. This can be done by the same motion mechanism or a separate motion mechanism.

A second motion mechanism can be provided (in particular, e.g. a mechanical coupling in the form of a sprocket, toothed belt, or linkage) which can rotate projector 3, i.e. presently image source 6 and plate 5, about a vertical axis and at the same time also rotate sensor device 2 accordingly.

Angle changes, e.g. about a horizontal or vertical axis, can also be obtained by a suitable arrangement and motion of beam guiding elements, such as e.g. lenses and/or mirrors.

The disclosure was presently explained in more detail in the context of a linking device 9 as well as a suspension device 11, where the filling machine can also additionally or alternatively have the following attachments, for example: clipper, weighing device, shaping and separating device, transport device, sorting device, packaging device, robot, etc.

The invention claimed is:

1. Apparatus for food production, with a control device which is connected to an input device for operating said apparatus, wherein said input device is configured as a non-contact input device,
   wherein said input device has a projector for generating a virtual user interface projected in space,
   wherein said projector has a display as image source, and a plate which is configured such that it focuses diffusely emitted light rays from the image source to form said virtual user interface image,
   wherein said control device has at least one interface for sending changeable video signals to said display, and
   wherein said virtual user interface is positioned in the same plane and at the same position as an infrared radiation field generated by a sensor device.

2. Apparatus for food production according to claim 1, wherein said sensor device is configured and arranged such that it can detect non-contact input by a finger or an object and/or gesture control.

3. Apparatus for food production according to claim 2, wherein said sensor device comprises an IR sensor device or a laser sensor device.

4. Apparatus for food production according to claim 1, wherein said apparatus for food production has several non-contact input devices at different locations which are connected to said control device.

5. Apparatus for food production according to claim 4, wherein said apparatus is configured such that said respective image sources receive the same video signals such that the same user interface is present at different locations of said apparatus or different video signals.

6. Apparatus for food production according to claim 1, wherein said apparatus is a filling machine with at least one attachment from the following group:
linking device, clipper, suspension device, weighing device, shaping and separating device, transport device, sorting device, packaging device, and robot.

7. Apparatus for food production according to claim 6, wherein said filling machine is configured such that said at least one attachment has a non-contact input device which is connected to said control device of said filling machine.

8. Apparatus for food production according to claim 6, wherein said filling machine and/or an attachment has an input device each on sides that are oppositely disposed when viewed in direction of transport.

9. Apparatus for food production according to claim 1, wherein an angle of inclination of said virtual user interface is changeable relative to a horizontal plane and/or can be rotated about a vertical axis.

10. Apparatus for food production according to claim 1, wherein said image source is a display.

11. Apparatus for food production according to claim 10, wherein said display is an LCD display.

12. Apparatus for food production, with a control device which is connected to an input device for operating said apparatus, wherein said input device is configured as a non-contact input device,
wherein said input device has a projector for generating a virtual user interface projected in space,
wherein said projector has a display as image source, and a plate which is configured such that it focuses diffusely emitted light rays from the image source to form said virtual user interface image,
wherein said control device has at least one interface for sending changeable video signals to said display,
wherein said virtual user interface is positioned in the same plane and at the same position as an infrared radiation field generated by a sensor device, wherein the infrared radiation field generated by the sensor device comprises infrared rays, and wherein the sensor device is configured to detect a broken beam path of the infrared rays at the virtual user interface projected in space to determine a user input,
wherein an angle of inclination of said virtual user interface is changeable relative to a horizontal plane and/or can be rotated about a vertical axis, and
wherein the angle of inclination is changeable via one or more of:
a pivotable common support to which the projector and the sensor device are mounted,
a movement of beam guiding elements including lenses and/or mirrors, and
a motion mechanism which controls the inclination of projector relative to the horizontal plane and/or relative to a vertical plane wherein the sensor device is also moved accordingly synchronously by the same motion mechanism or a separate motion mechanism.

13. Apparatus for food production, with a control device which is connected to an input device for operating said apparatus, wherein said input device is configured as a non-contact input device,
wherein said input device has a projector for generating a virtual user interface projected in space,
wherein said projector has a display as image source, and a plate which is configured such that it focuses diffusely emitted light rays from the image source to form said virtual user interface image,
wherein said control device has at least one interface for sending changeable video signals to said display,
wherein said virtual user interface is positioned in the same plane and at the same position as an infrared radiation field generated by a sensor device, wherein the infrared radiation field generated by the sensor device comprises infrared rays, and wherein the sensor device is configured to detect a broken beam path of the infrared rays at the virtual user interface projected in space to determine a user input,
wherein said apparatus is a filling machine with at least a suspension device, and
wherein said filling machine is configured such that said suspension device has the non-contact input device which is connected to said control device of said filling machine, wherein a smoking stick, which has to be taken off, can move through an image plane of the virtual user interface.

* * * * *